United States Patent
Hamilton et al.

[11] Patent Number: 5,868,424
[45] Date of Patent: Feb. 9, 1999

[54] SUBSTANTIALLY SMOKE-FREE AND PARTICULATE-FREE INFLATOR FOR INFLATABLE SAFETY RESTRAINT SYSTEM

[75] Inventors: Brian K. Hamilton, Littleton; Peter L. Stang, Englewood, both of Colo.

[73] Assignee: OEA, Inc., Aurora, Colo.

[21] Appl. No.: 611,650

[22] Filed: Mar. 6, 1996

[51] Int. Cl.[6] ................................................. B60R 21/28
[52] U.S. Cl. ................................................ 280/741; 149/2
[58] Field of Search ................................. 280/741; 149/2

[56] References Cited

U.S. PATENT DOCUMENTS

| | | | |
|---|---|---|---|
| 3,159,104 | 12/1964 | Hodgson | 149/14 |
| 3,193,677 | 7/1965 | Thomas | 149/19 |
| 3,429,265 | 2/1969 | Longwell et al. | 149/22 |
| 3,712,058 | 1/1973 | Cooper | 60/207 |
| 3,954,528 | 5/1976 | Chang et al. | 149/19.4 |
| 4,696,705 | 9/1987 | Hamilton | 149/21 |
| 4,931,111 | 6/1990 | Poole et al. | 149/35 |
| 4,948,438 | 8/1990 | Patrick et al. | 149/38 |
| 4,948,439 | 8/1990 | Poole et al. | 149/46 |
| 5,060,973 | 10/1991 | Giovanetti | 280/736 |
| 5,139,588 | 8/1992 | Poole | 149/61 |
| 5,324,075 | 6/1994 | Sampson | 280/736 |
| 5,380,380 | 1/1995 | Poole et al. | 149/22 |
| 5,545,272 | 8/1996 | Poole et al. | 149/48 |
| 5,551,725 | 9/1996 | Ludwig | 280/737 |
| 5,641,938 | 6/1997 | Holland et al. | 149/48 |

FOREIGN PATENT DOCUMENTS

| | | |
|---|---|---|
| 0 340 761 | 5/1989 | European Pat. Off. . |
| 0 576 326 A1 | 6/1993 | European Pat. Off. . |

*Primary Examiner*—Edward A. Miller
*Attorney, Agent, or Firm*—Sheridan Ross P.C.

[57] ABSTRACT

Provided is an inflator for providing propellant gases to inflate a bag of an automotive safety system for restraining an occupant of a vehicle in which the inflator is a pure pyrotechnic inflator that generates propellant gases that are substantially free of metal-containing particulate and condensable materials without requiring storage of a pressurized gas. The propellant gases are generated from a solid gas-generating propellant composition including two components. A first component is fuel-rich and has a fast burn rate. The second component is a oxidizer that, although having a slow burn rate, operates in combination with the first component at an acceptably fast burn rate to oxidize carbon monoxide and/or hydrogen produced during combustion of the first component to carbon dioxide and/or water, respectively.

48 Claims, 4 Drawing Sheets

SUBSTANTIALLY SMOKE-FREE AND PARTICULATE-FREE INFLATOR FOR INFLATABLE SAFETY RESTRAINT SYSTEM

FIELD OF THE INVENTION

The present invention involves an inflator for inflating a bag of an automotive safety system for restraining an occupant of a vehicle during an emergency situation.

BACKGROUND OF THE INVENTION

Inflatable safety systems have gained wide use in vehicles, particularly automotive vehicles. Such inflatable systems restrain an occupant of the vehicle during an emergency situation by inflating a bag, that acts as a restraint mechanism to protect the occupant from injury. During operation, the bag is inflated by filling the bag with a gas that expands the bag a desired amount to satisfactorily restrain and protect the occupant.

The gas used to inflate the safety bag is typically provided by a device called an inflator. One type of inflator holds a highly pressurized gas that is allowed to expand into the bag to inflate the bag. A second type of inflator has a propellant material that chemically reacts in a combustion reaction to produce gases that inflate the bag. A third type of inflator uses a combination of gas production from a propellant material by chemical reaction and gas supplied from a pressurized gas source.

Desirable features of an inflator, from an economic standpoint, include (i) small size so that the inflator may be easily incorporated into the vehicle design; (ii) light weight so that the inflator does not detrimentally affect fuel efficiency of the vehicle, and (iii) the use of low cost materials and designs so that the inflator does not excessively impact the price of the vehicle. Important technical considerations include making sure that the inflator is capable of inflating the bag to a desired amount in a desired time and that gases used to fill the bag do not create a health or safety problem. For example, it is desirable to inflate the bag with gases that do not contain dangerous amounts of toxic materials, such as carbon monoxide and oxides of nitrogen, that could injure vehicle occupants. The gases also should not contain dangerous amounts of flammable materials, such as hydrogen, that could ignite and create a hazard for vehicle occupants. Furthermore, it is desirable that the gases not be smokey, because the presence of a smoke during an emergency situation tends to create confusion or panic among vehicle occupants even if the smoke is not itself harmful.

The use of a stored, pressurized gas in an inflator provides the advantage that it is easy to avoid the presence of toxic or otherwise unsafe gases. The use of such a stored gas in inflators is, however, generally uneconomic because the pressure vessels required to store the gas are bulky, heavy and expensive. Inflators using gas-generating propellant materials have the advantage that the inflators are less bulky, are smaller, weigh less, and are generally less expensive than inflators having a stored gas.

One disadvantage of using gas-generating propellants, however, is that many of the available propellants produce significant quantities of toxic gases, such as carbon monoxide, and/or flammable gases, such as hydrogen. Also, many propellant compositions contain metals that, upon combustion, form undesirable metal-containing particulates and/or condensables that can create undesirable smoke. It is generally required that undesirable particulates and/or condensables be filtered out of the gas prior to introduction of the gas into the bag. As used herein, a condensable is a component that is initially in a gaseous state with the propellant gases immediately following combustion of a gas-generating propellant material, but that is transformed into a liquid or solid form as the propellant gases cool. Also, many propellants have components that include a halogen, such as chlorine, that may form a combustion product that may be toxic or that may contribute to formation of undesirable particulates and/or condensables. Furthermore, many propellant materials are expensive and can add significantly to the cost of the inflator.

One method for reducing the amount of carbon monoxide and hydrogen produced by a gas-generating propellant is to use a hybrid inflator design, such as is described in any of co-pending U.S. patent application Ser. Nos. 08/210,668; 08/328,657 and 08/389,297, the contents of all of which are incorporated herein by reference in their entireties. In a hybrid inflator, both a stored, pressurized gas and a gas-generating propellant are used in order to reduce the aforementioned problems that have been encountered with the use of propellants alone. Although such hybrid inflators perform well, it would be desirable to avoid the complexity, bulk and cost associated with storage of a pressurized gas.

There exists a need for an improved inflator that avoids the cost, bulk and complexity of storing a pressurized gas and that is capable of delivering safe propellant gases to inflate an inflatable safety bag without the need for expensive designs, materials or equipment.

SUMMARY OF THE INVENTION

The above-discussed problems with existing inflators are addressed with the present invention, which provides a pure pyrotechnic inflator that generates propellant gases that are substantially free of metal-containing particulates and condensables and that have, if at all, only acceptably low levels of toxic and/or flammable components.

A major aspect of the present invention is the use in an inflator of a solid gas-generating propellant composition that comprises a first solid component, which is a fuel-rich component, and a second solid component, which is an oxidizer. The two components operate advantageously in combination when the inflator is actuated to produce propellant gases having the desired characteristics as noted. The fuel-rich component, if burned alone, would produce significant amounts of undesirable carbon monoxide and/or hydrogen gas. The oxidizer, however, supplies oxygen to oxidize at least some of the carbon monoxide and/or hydrogen, produced by the fuel-rich component, to carbon dioxide or water, as the case may be. In one preferred embodiment, the solid gas-generating propellant composition consists essentially of materials composed of only elements selected from the group consisting of carbon, hydrogen, oxygen and nitrogen. Preferred as the fuel-rich component are extruded nitramine gun-type propellants based on RDX or HMX. Other suitable fuel-rich components include PETN, TAGN and tetrazoles, such as 5-aminotetrazole. A preferred oxidizer is ammonium nitrate. Particles of ammonium nitrate crystals are preferably loosely bound, optionally with a coolant, using a polymeric binder.

Each of the first component and the second component, if each were used alone, would generally be inadequate to provide propellant gases having a desired composition at a suitable burn rate. This is because the first component has excellent burn characteristics and is capable of supplying propellant gases at an acceptable rate for inflating an inflatable safety bag. But, because the first component is fuel-rich, it would produce an undesirable level of carbon monoxide and/or hydrogen gas upon combustion. The second component, if combusted alone would produce gases having little carbon monoxide and/or hydrogen gas, but would have a burn rate that is too slow to provide propellant gases at a suitable rate for inflator applications. By combining the two components, however, the fast burn rate of the first-component may be realized without the production of the undesirable carbon monoxide and/or hydrogen.

Because the solid gas-generating propellant composition used in the present invention produces propellant gases having acceptably low levels of carbon monoxide and hydrogen gas, it is unnecessary for the inflator of the present invention to use a stored, pressurized gas, as is the case with hybrid inflators. Also, because the first component and the second component are substantially free of metal-containing materials, the inflator of the present invention does not require a filter to remove metal-containing particulates and/or condensables prior to introduction of propellant gases into an inflatable safety bag of a vehicle safety restraint system. The inflator of the present invention is capable of providing safe and smokeless propellant gases using relatively inexpensive solid propellant materials while avoiding the expense, bulk, weight or complexity of using either a filter or a stored pressurized gas.

In one important aspect of the present invention, particles of oxidizer crystals are bound by a highly porous web of polymeric material. This web-bound structure is particularly useful when using oxidizers, such as ammonium nitrate, that undergo a crystalline phase change within the ambient temperature range for storage and operation of inflators. Inflators are typically designed for storage and operation within a temperature range of −40° C. to about 105° C. Crystalline phase changes, and the accompanying volume and shape changes, make it very difficult to control the condition of a propellant over time when an oxidizer such as ammonium nitrate is incorporated into the structure of a propellant composition. As such a propellant ages, cyclical phase changes cause disruption of the binder-oxidant bond within the propellant composition, causing wild variations in the burning speed of the propellant composition. This phenomenon has resulted in explosions of ammonium nitrate propellant rocket motors.

According to the present invention, the concern of disruption of the oxidizer-binder bond is addressed by removing the oxidant from the structural portion of the propellant composition. Rather, crystals of the oxidizer are suspended in a structure bound by a filamentary web of a polymeric material, such as a polymeric binder. This web structure, including particles of oxidizer crystals and other materials that may be bound by a web, has a high porosity that typically is from about 20% to about 80%, with porosities greater than about 40% being preferred.

In one embodiment, granules having the web-bound structure may be made by mixing oxidant crystals with a solution containing the binder, such as a solution of hydroxypropylcellulose in an alcohol solvent. Other materials, such as a coolant, may also be mixed together with the oxidant crystals. The solvent may then be evaporated from the mixture, causing the polymeric material to come out of solution and form a web of fibers, or filaments, that entrap, or bind, the oxidizer crystals and, optionally, additional materials such as a coolant. The dried mixture may then be formed into granules. Because the granules are very porous and the binder is very compliant, the oxidizer crystals can undergo shape and volume changes associated with crystalline phase change, without substantially changing the physical form of the overall propellant composition.

The fuel-rich component is typically provided in separate, extruded grains, or pellets (which are typically at about 90% to about 97% of theoretical density). These extruded pellets may be mixed with the oxidant-containing granules having the porous web-bound structure.

Preferably, however, the extruded grains, having the fuel-rich component, are enmeshed in the polymeric web along with the oxidizer crystals. To enmesh fuel-rich grains in the web, the grains could be added to the mixture, having the binder and the oxidizer, prior to evaporation of all of the solvent from the mixture. In this case, the mixed materials (e.g., fuel-rich grains, oxidant crystals, coolant material and any other ingredients) would be formed into a single web-bound structure, which could be shaped and sized to a bulk form suitable for substantially entirely filling the cavity of an inflator in which the final propellant composition is to be used. The mixture is then completely dried to produce the final, hardened form having the porous web-bound structure. In this embodiment, the structure may be used to: (i) immobilize substantially all components of the entire propellant composition in a desired locational relationship; (ii) permit expansion and contraction of the oxidizer crystals with crystalline phase changes; and (iii) allow the fuel-rich extruded grains to control the burning speed of the total propellant composition.

DETAILED DESCRIPTION

The present invention generally relates to a pure pyrotechnic inflator for vehicle inflatable safety restraint systems. By pure pyrotechnic, it is meant that substantially entirely all gases provided by the inflator are propellant gases generated by a solid gas-generating propellant composition. There is no need to store a pressurized gas and the inflator is, therefore, substantially in the absence of a stored, pressurized gas. Furthermore, the pure pyrotechnic inflator of the present invention uses a solid gas-generating propellant composition that is substantially free of metals, so that the propellant gases are substantially in the absence of metal-containing particulate and/or condensable materials, eliminating the need for a filter to remove any such particulate and/or condensable materials. Furthermore, in a preferred embodiment, the solid gas-generating propellant composition is substantially free of halogen-containing materials, so that the propellant gases are substantially in the absence of halogen-containing components.

Figure 1:
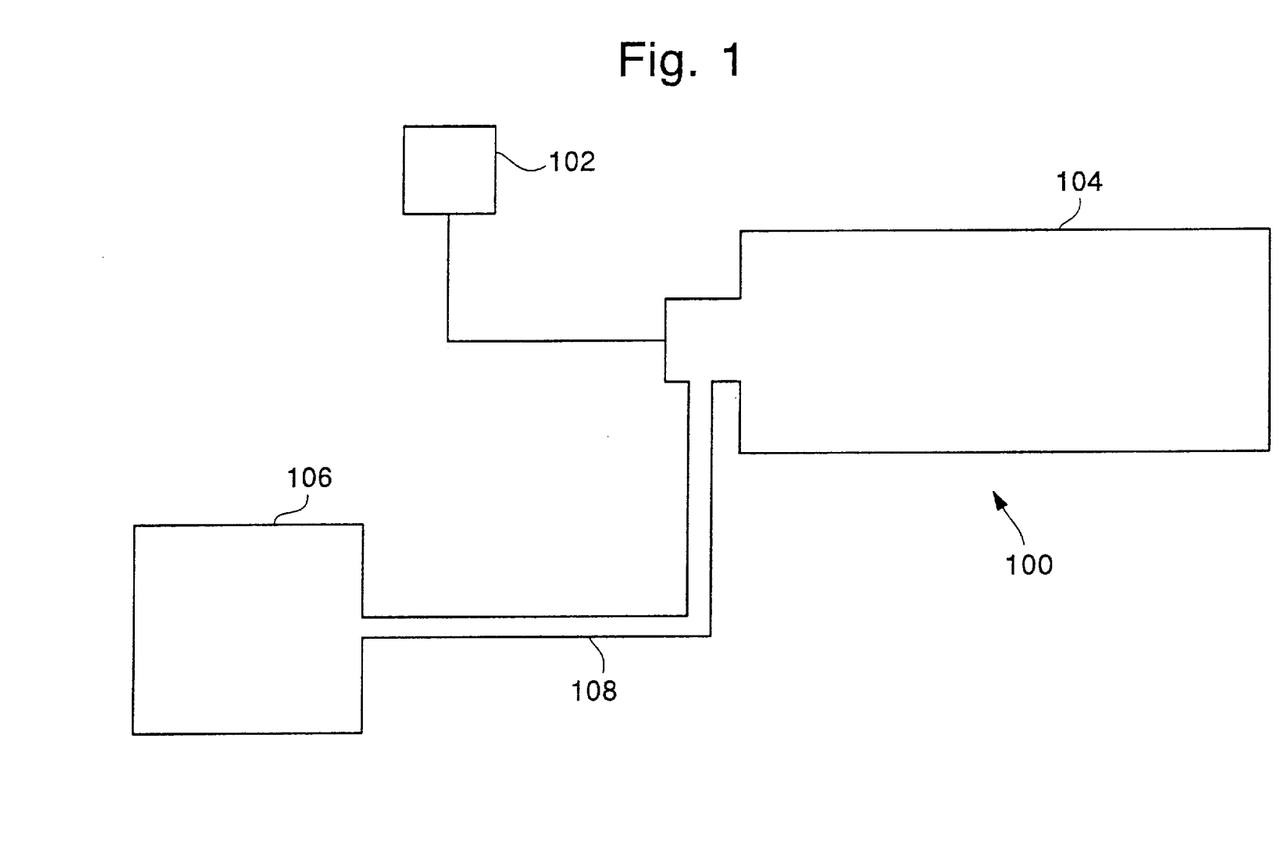
FIG. 1 is a schematic showing a vehicle inflatable safety system of the present invention.

Referring to FIG. 1, one embodiment of a vehicle inflatable safety system 100 is shown. The primary components of the inflatable safety system 100 include a detector 102, an inflator 104 and an inflatable bag 106. When the detector 102 senses a condition requiring inflation of the inflatable bag 106 (e.g., a predetermined deceleration), a signal is sent to the inflator 104 to ignite a solid gas-generating propellant composition in the inflator 104 to supply propellant gases from the inflator 104 to inflate the inflatable bag 106 via a gas-flow conduit 108.

The solid gas-generating propellant composition useful with the present invention comprises two combustible components, with a first component being relatively fuel-rich and a second component being relatively oxygen-rich. The two components are combined to provide desired burn characteristics to generate propellant gases, for inflating the inflatable bag 106, that have, at most, only acceptably low concentrations of carbon monoxide and hydrogen gases, so that the propellant gases are safe to use in inflatable safety systems. Furthermore, the solid gas-generating propellant composition, including both of the first component and the second component, is substantially free of metal-containing materials, so that the generated propellant gases are substantially free of metal-containing particulates and condensables, thereby eliminating the need for a filter. In a preferred embodiment, the solid gas-generating propellant composition is also substantially free of halogen-containing materials, so that the generated gas will be substantially free of halogen-containing components that could be toxic or otherwise unsafe.

The first component is a fuel-rich component. By fuel-rich, it is meant that the first component contains oxygen in its molecular structure, if at all, in an amount that is smaller than a stoichiometric amount of oxygen that would be required, during a self-sustained combustion reaction, to convert all hydrogen that may be in the first component to water and to convert all carbon that may be in the first component to carbon dioxide. If the first component were combusted alone, it would, therefore, produce gaseous decomposition products including a significant amount of carbon monoxide and/or hydrogen, both of which are undesirable for purposes of inflating an inflatable bag of a vehicle safety restraint system.

As noted previously, the first component is substantially free of metals and is also, preferably, substantially free of halogen-containing materials. Preferably, the first component comprises carbon and/or other elements, if at all, only as selected from the group consisting of oxygen, hydrogen, nitrogen, and combinations thereof. Particularly preferred for use as the fuel-rich component are fuel-rich materials of gun-type propellants because gun-type propellants are readily available, relatively inexpensive and their burn characteristics are well understood. Gun-type propellants, as used herein, are high temperature, fuel-rich components such as single, double or triple-base propellants; and nitramine propellants such as LOVA (low vulnerability ammunition) and HELOVA propellants (high energy, low vulnerability ammunition). More specifically, gun-type propellants are fuel-rich and have a combustion temperature ranging from about 2500° K to about 3800° K, and typically greater than about 3000° K. Examples of suitable gun-type propellants include nitramine-based propellants having as major ingredients RDX (also known as hexahydrotrinitrotriazine or cyclotrimethylenetrinitramine) or HMX (also known as cyclotetramethylenetetranitramine). PETN (also known as pentaerythritol tetranitrate) and TAGN (also known as triaminoguanidine nitrate) could also serve as major ingredients in gun-type propellants. Other suitable gun-type propellants include those incorporating tetrazole-based compounds and triazole-based compounds, and particularly 5-aminotetrazole. Most preferred as the fuel-rich, first component is RDX in a gun-type propellant.

The second component is an oxidizer that provides oxygen for oxidizing decomposition products of the first component, so that at least some of the hydrogen and/or carbon monoxide generated by the first component during a combustion reaction will be oxidized to water and/or carbon dioxide, respectively. As used herein, an oxidizer is any material capable of supplying oxygen to increase the ultimate yield of carbon dioxide and/or water from combustion products of the fuel-rich component, and thereby reduce the ultimate yield of carbon monoxide and/or hydrogen from combustion of the fuel-rich component.

To avoid metal-containing particulate residue and/or metal-containing condensables, that could require filtration, the oxidizer is substantially free of metals. Furthermore, it is preferred that the oxidizer also be substantially free of halogen-containing materials. More preferably, the oxidizer comprises only elements selected from the group consisting of carbon, oxygen, nitrogen and hydrogen, and most preferably the oxidizer comprises only the elements of nitrogen, oxygen and hydrogen. Examples of preferred materials for use as the oxidizer include oxygen-containing ammonium salts, such as ammonium dinitramide and ammonium nitrate. Ammonium nitrate is particularly preferred as an oxidizer.

A sufficient amount of the second component should be used to ensure that the gases generated from the combustion of the solid gas-generating propellant composition have acceptably low levels of carbon monoxide and hydrogen. A sufficient amount of the oxidizer should be used so that the generated gases, when expanded to the pressure of one atmosphere absolute, comprise carbon monoxide, if at all, at a concentration of smaller than about 1.5 mole percent, preferably smaller than about 1 mole percent, more preferably smaller than about 0.5 mole percent, and most preferably smaller than about 0.05 mole percent. Also, a sufficient amount of the oxidizer should be used so that the gases generated from the combustion reaction, when expanded to a pressure of one atmosphere absolute, comprise hydrogen, if at all, at a concentration of smaller than about 5 mole percent.

As noted, it is important to combine the first component and the second component in an appropriate ratio such that carbon monoxide and/or hydrogen levels in exhaust gases are kept to an acceptably low level. Therefore, it is generally desired that the solid gas-generating propellant composition have at least 80% of a stoichiometric amount of oxygen required to oxidize all carbon and all hydrogen in the solid gas-generating propellant composition to carbon dioxide and water, respectively. Preferably, the amount of oxygen in the solid gas-generating propellant composition is greater than about 90% of such a stoichiometric amount, more preferably greater than about 95%, and most preferably from about 98% to about 100% of such a stoichiometric amount.

It has been found, surprisingly, that the solid gas-generating propellant composition useful with the present invention is capable of generating propellant gases that have acceptably low levels of carbon monoxide and hydrogen without increasing to unacceptably high levels the concentration of nitrogen oxide components in the propellant gases. It should be noted, however, that if the oxygen content of the solid gas-generating propellant composition becomes too high, then it is possible that nitrogen oxide concentrations may become unacceptably high. Preferably, the amount of oxygen present in the solid gas-generating propellant composition should be less than about 100% of a stoichiometric amount required for complete oxidation of all carbon and hydrogen in the solid gas-generating propellant composition to carbon dioxide and water, respectively.

Furthermore, it should be recognized that, although the additional oxygen required to oxidize carbon monoxide and hydrogen that may be produced by the fuel-rich component will be provided by the oxidizer, it is possible that other materials may be used in combination with the oxidant. Such other materials could include, for example, binders and coolants. Moreover, the oxidizer could comprise a mixture of different oxidizing materials.

Materials that are useful as an oxidizer of the present invention are typically slower burning than the fuel-rich component. The solid gas-generating propellant composition should, therefore, have at least a minimum amount of the fuel-rich component that is required to ensure that the solid gas-generating propellant composition has an acceptably high burn rate for use in inflator applications. This is especially true when ammonium nitrate is used as the oxidizer, because ammonium nitrate alone burns at an unacceptably slow rate, but will burn at an acceptably high rate in the presence of an adequate amount of the faster-burning fuel-rich material. The desired burn characteristics will depend on the particular inflatable safety system application. In most embodiments, the solid gas-generating propellant composition is capable of burning sufficiently fast to be capable of generating propellant gases at a sufficient rate to fully inflate an inflatable bag in less than about 40 to 80 milliseconds following actuation of the inflator. Typically, the solid gas-generating propellant composition will comprise, by weight, at least about 1 part of fuel-rich component per 8 parts of oxidizer. Care must be taken, however, to ensure that a sufficient amount of the fuel-rich component is used to provide the desired burn rate and sufficient oxidizer is used to provide the desired amount of oxygen, as discussed above.

As noted previously, the solid gas-generating propellant composition may comprise, in addition to the fuel-rich component and the oxidizer, one or more additives to further improve the properties of the solid gas-generating propellant composition for use in vehicle inflatable safety systems. Such additives include, for example, binders, plasticizers, coolants and stabilizers. Typical binders include cellulosic materials such as cellulose acetate and hydroxypropylcellulose; glycidyl azide polymer (GAP), which burns more vigorously than cellulosic materials; and stabilizers to inhibit thermal decomposition. Example plasticizers include nitrate ester plasticizers, e.g., TMETN (trimethylolethane trinitrate) and TEGDN (triethyleneglycol dinitrate); azide substituted polymers, e.g., a GAP material; and inactive plasticizers such as citrate esters. The use of a coolant will depend upon the particular mixture of fuel-rich component and oxidizer. A coolant is any material that reduces the net thermal energy output, and therefore also reduces the temperature, during combustion of the solid gas-generating propellant composition. The coolant is, therefore, used to keep the burn temperature in a desired range, which is typically between about 1200° K and 2000° K. Examples of coolants are disclosed in U.S. Pat. No. 3,362,859, the entire contents of which are incorporated herein. Preferred coolants are oxalates, including ammonium binoxalate and ammonium oxalate.

Binders will typically be present in an amount of no greater than about 20 weight percent of the total weight of the solid gas-generating propellant composition. Other materials, such as plasticizers and coolants, will generally be present in amounts of no greater than about 5 weight percent of the total weight of the solid gas-generating propellant composition.

The particular formulation of the solid gas-generating propellant composition will depend upon the specific requirements for an application, including the specific permissible threshold concentration of carbon monoxide and hydrogen in the generated propellant gases. For most applications, however, an inflator will be loaded with a total of from about 5 grams to about 100 grams of the fuel-rich component and the oxidizer component, combined.

As loaded in an inflator, the gas-generating propellant composition may be in any suitable form to provide acceptable stability, shelf life and burn characteristics. In a preferred embodiment, the fuel-rich component is provided in extruded grains, or pellets, and the oxidizer component is provided in separate granules.

Figure 2:
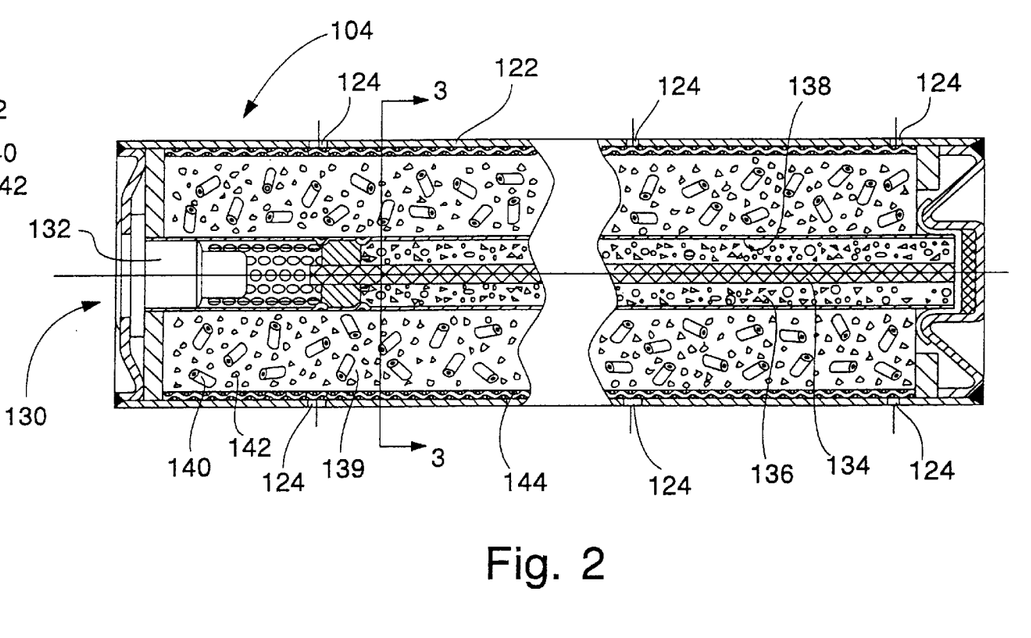
FIG. 2 shows a cross section through a longitudinal axis of one embodiment of an inflator of the present invention.
Figure 3:
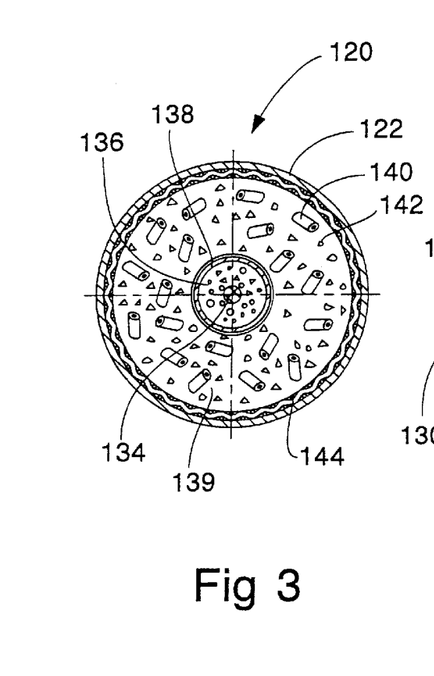
FIG. 3 shows a cross section perpendicular to a longitudinal axis of one embodiment of an inflator of the present invention.

Referring now to FIGS. 2 and 3, one embodiment of an inflator 104 of the present invention is described. The inflator 104 has an inflator housing 122 with gas exit ports 124 to permit propellant gases generated by the inflator 104 to exit the inflator housing 122 for direction of the propellant gases to an inflatable bag (not shown). Substantially coaxial with the inflator housing is an ignition assembly 130. The ignition assembly 130 comprises an initiator 132, an ignition cord 134 and ignition material 136, all of which are disposed inside of an ignition housing 138. In an interior annular volume between the inflator housing 122 and the ignition housing 138, is disposed the solid gas-generating propellant composition 139 of the present invention in the form of a mixture of pellets 140 and granules 142. The pellets 140 comprise the fuel-rich component and the granules 142 comprise the oxidizer component. Interposed between the inflator housing 122 and the solid gas-generating propellant composition 139 is a strainer 144, with a burst seal (not shown) positioned between the strainer 144 and the solid gas-generating propellant composition 139. The strainer 144, which typically is a wire mesh or expanded metal structure, is designed to retain the solid gas-generating propellant composition and prevent solid fragments of the composition from exiting the inflator 104 during operation. Also, the mass of the strainer 144 may be used as a heat sink to partially cool propellant gases exiting the inflator 104. The total mass of the strainer 144 may be adjusted as appropriate to provide the desired level of heat exchange for cooling propellant gases.

The pellets 140, as noted, comprise the fuel-rich component. The pellets 140 also typically comprise a minor amount of a binder, preferably a cellulosic binder. The pellets 140 are typically extruded, nitramine-based, gun-type propellant compositions such as those described in copending U.S. patent application Ser. Nos. 08/210,668; 08/328,657 and 08/389,297, the contents of which are incorporated herein in their entireties. The pellets 140, however, should preferably have a minimum outside dimension of larger than about 1 mm. The pellets 140 may be of any desired shape providing adequate burn characteristics. Hollow extruded cylinders are preferred. The size and shape of the pellets 140 may be varied, however, to accommodate the needs of the particular vehicle inflatable safety system. In the case of a hollow cylindrical shape, the pellets 140 will typically be sized with an external diameter of from about 1.5 mm to about 5 mm, an internal diameter of from about 0.4 mm to about 1.5 mm, and a length of from about 8 mm to about 20 mm.

The granules 142, as noted, comprise the oxidizer. The granules 142 typically, however, also comprise a coolant that helps to regulate the combustion temperature of the solid gas-generating propellant composition 139 to achieve desired burn characteristics. The granules 142 also typically comprise a binder, preferably a cellulosic binder. In the case of an oxidizer, such as ammonium nitrate, that undergoes a crystalline phase change, and also a volume change accompanying the phase change, during normal storage conditions, the granules 142 should be formed in a manner that provides for a high porosity in the granules 142 to accommodate the volumetric expansion and contraction of the oxidizer during the phase change. The porosity, in combination with the binder composition and granule morphology, should be sufficient to accommodate expansion of at least one component of the solid gas-generating propellant composition without substantial physical degradation of the bulk form of the solid gas-generating propellant composition. Such porosity should be larger than about 20%, preferably larger than about 30%, more preferably larger than about 40%, and even more preferably larger than about 50%. Most preferably, the porosity of the granules 142 is from about 20% to about 70% or, conversely, the density of the granules 142 is from about 80% to about 30% of a theoretical (i.e., perfectly compressed) density.

Each of the granules 142 preferably has a bulk structure comprising a porous web of polymeric material, which suspends and binds particles of oxidizer crystals. Particles of coolant material, when used, may also be suspended and bound in the porous web of polymeric material. The polymeric material may be any suitable binder, such as a cellulosic material, as previously described. The particles having the oxidizer should be small enough to accommodate shape and volume changes associated with crystalline phase changes without substantial degradation of the particle structure. The particles having the oxidizer are preferably of a size smaller than about 100 microns and are typically of a size between about 5 microns and 100 microns, with sizes smaller than about 50 microns being preferred and sizes smaller than about 30 microns being particularly preferred. As used herein, a web of polymeric material refers to a three dimensional network of fibrous or filamentary polymer.

The pellets 140 are substantially larger than the particles of the oxidizer in the granules 142. In this manner, the pellets 140 adequately control burn characteristics of the solid gas-generating propellant composition 139, while the particles of oxidizer crystals are in a form that accommodates the expansion and contraction, and shape changes, associated with crystalline phase changes of the oxidizer. On a basis of maximum linear particle dimension, the pellets 140 are preferably greater than about 50 times as large as the particles of oxidizer crystals, more preferably greater than about 100 times as large and most preferably greater than about 1000 times as large. On a volume basis, the pellets 140 should typically have an average size of greater than about 1000 times larger than the average size of particles of oxidizer crystals, preferably greater than about 10,000 times larger, more preferably greater than about 100,000 times larger, and most preferably greater than about 1,000,000 times larger than the particles of oxidizer crystals.

The web-bound structure, having particles of oxidant crystals suspended in and bound by a web of polymeric material, may be formed in any suitable manner. One method for preparing such structures will be explained with respect to ammonium nitrate crystals as the oxidant particles. Ammonium nitrate crystals, and optionally particles of a suitable coolant, are mixed with a liquid solution, comprising the polymeric material dissolved in a suitable solvent. For example, a desired amount of hydroxypropylcellulose, as a polymeric binder, could be dissolved in an alcohol, such as methanol, ethanol or isopropanol. The amount of the polymeric material is typically no greater than about 2 weight percent relative to the weight of the ammonium nitrate. After the materials are thoroughly mixed, the solvent is evaporated, usually by heating the mixture. As the solvent evaporates, the polymer will come out of solution and form the web structure about the particles of ammonium nitrate crystals, and about coolant particles also, if present. After the resulting web-bound structure is relatively dry, it can be formed into granules by any known manner, such as by the use of a Stokes granulator.

Granules containing the oxidizer could be mixed with extruded grains having the fuel-rich component to prepare the solid gas-generating propellant composition. A suitable binder could be used to bind the pellets and granules into a single form, if desired.

As an alternative embodiment, pellets, having the fuel-rich component, could be incorporated into the web-bound structure along with particles of oxidizer crystals. Such a composition may be prepared in a manner similar to that described above. The oxidizer particles, and optionally a coolant, may be mixed with a solution containing the polymeric material dissolved in a solvent. Prior to evaporation of substantially all of the solvent, however, the pellets containing the fuel-rich component are added to and intimately mixed with the other materials. The remaining solvent may then be evaporated to form a porous web-bound structure having both the particles of oxidizer and the pellets bound by a web of the polymeric binder.

With reference back to FIG. 1, during operation of the inflatable safety system 100, the detector 102 detects an emergency situation, such as a sudden deceleration, and sends a signal to actuate the inflator 104 to cause propellant gases to be generated that are then directed, by the gas flow conduit 108, to inflate the inflatable bag 106. With reference to FIGS. 2 and 3, the inflator 104 is actuated by firing the initiator 132, which causes the ignition cord 134 to burn and to thereby also cause the ignition material 136 to burn. Burning of the ignition material 136 is vigorous enough to cause combustion of the solid gas-generating propellant composition 139 to create propellant gases that exit the inflator 104 through the gas exit ports 124 from which the propellant gases may be directed to inflate the inflatable bag 106 (as shown in FIG. 1).

With continued reference to FIGS. 2 and 3, the ignition cord 134 may be any suitable ignition cord such as an ITLX ignition cord. The ignition material 136 may be any suitable secondary explosive material capable of igniting the solid gas-generating propellant composition 139. Suitable for use as the ignition material 134 are materials rich in gun-type propellants, such as RDX.

Figure 4:
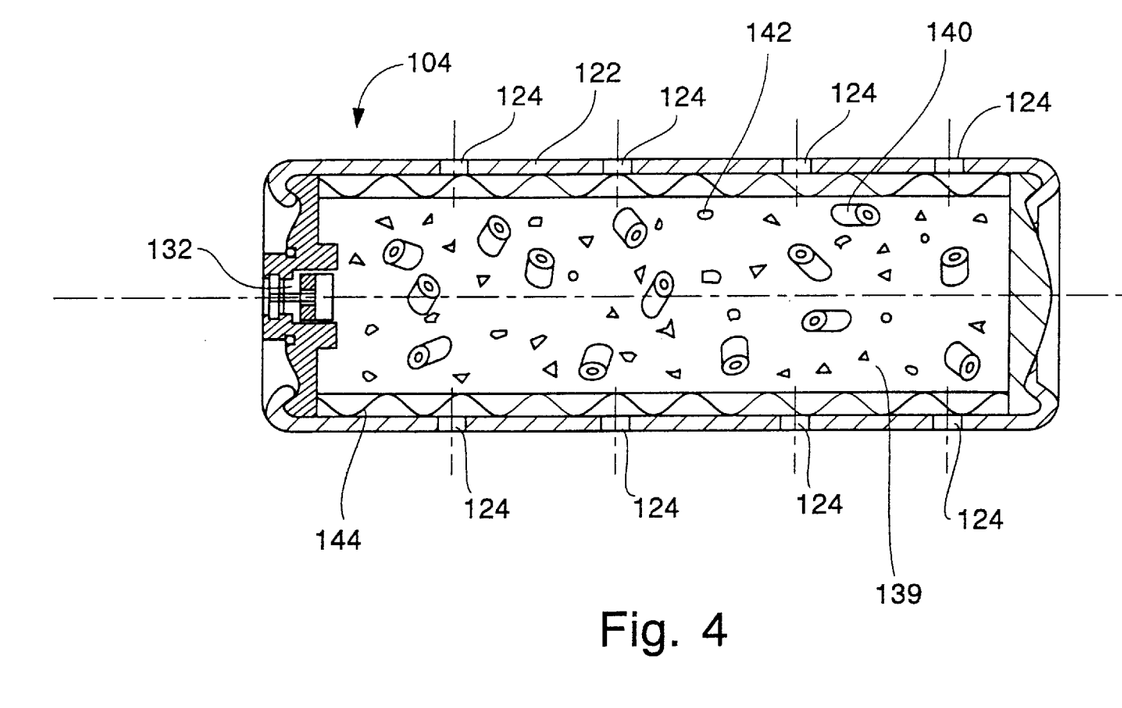
FIG. 4 shows a cross-section through a longitudinal axis of another embodiment of an inflator of the present invention.

In one embodiment of the inflator 104, one or both of the ignition cord 134 and the ignition material 136 may be eliminated from the inflator 104. In such an embodiment, the solid gas-generating propellant composition 139 is sufficiently ignitable that an intermediate ignition material 136 and/or ignition cord 134 is not required to ignite the solid gas-generating propellant composition. FIG. 4 shows one embodiment of the inflator 104 having no ignition cord or ignition material.

The embodiments of the inflator 104 shown in FIGS. 2–4 are representative of designs used for use in passenger air bag applications. Representative outside dimensions of the inflator 104 for passenger air bag applications would be, for example, about 130 mm in length and 45 mm in diameter.

Figure 5:
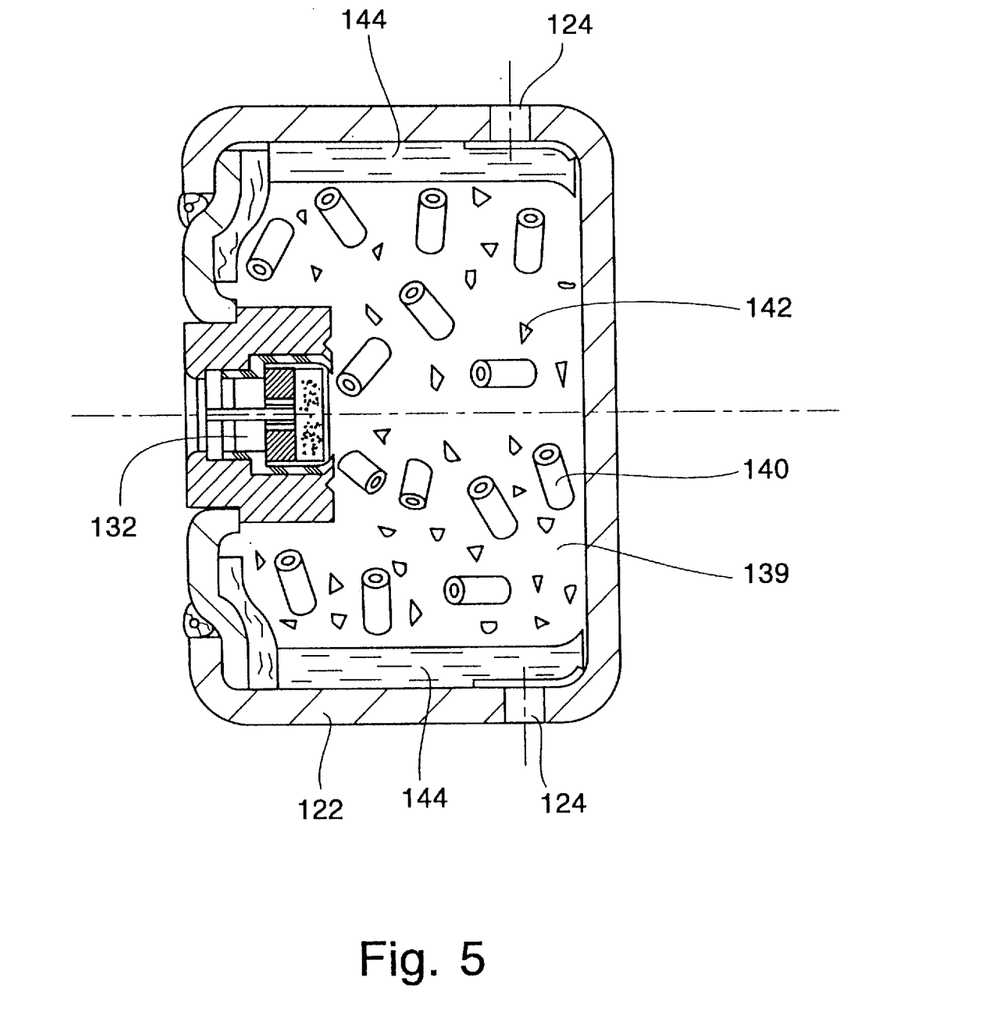
FIG. 5 shows a cross-section of yet another embodiment of an inflator of the present invention.

FIG. 5 shows an embodiment of the inflator 104 that is representative for use in driver air bag applications. Representative outside dimensions would be, for example, 36 mm in length and 50 mm in diameter.

EXAMPLES

Example 1

A solid gas-generating propellant composition is made using ammonium nitrate as an oxidant, ammonium binoxalate as a coolant, RDX as a fuel-rich component and hydroxypropyl-cellulose as a polymeric binder. The ammonium nitrate is in crystal particles of an average size of about 30 microns. The ammonium binoxalate is in crystal particles of an average size of about 10 microns. The RDX is in extruded pellets of a nitramine propellant containing 75 wt. % RDX, 12.5 wt. % cellulose acetate, 11.25 wt. % TMETN (trimethylolethane trinitrate), 0.6 wt. % ethyl centralite and 0.65 wt. % Akardite II (a commercially available stabilizer). The extruded nitramine pellets are in the shape of hollow cylinders having an outer diameter of 3.7 mm, an inner diameter of 1.0 mm, and a length of 8.0 mm.

A viscous solution is prepared having 1 gram of medium grade hydroxypropylcellulose dissolved in 60 ml of an azeotropic mixture of isopropyl alcohol and water. The solution is added to a mixture of 70 grams of the ammonium nitrate particles and 10 grams of the ammonium binoxalate particles. The wetted mixture forms a dough-like substance, which is then blended for uniformity, and dried to an appropriate stage. Next is then added 19 grams of the nitramine propellant pellets and the resulting mixture is mixed to uniformly disperse the propellant grains.

The total mixture is then shaped as desired and dried to form a web-bound structure of a rigid cake-like form, in which the propellant grains, the ammonium nitrate particles and the ammonium binoxalate particles are bound by a web of hydroxypropylcellulose. The rigid cake-like structure may be made in any desired shape and may be used as a monolithic solid gas-generating propellant composition to fill the cavity inside an inflator.

Alternatively, the dough-like mixture could be granulated, such as through a Stokes granulator, and the resulting granules dried. The granules could then be loosely mixed with the nitramine propellant pellets to make a non-monolithic solid gas-generating propellant composition.

Example 2

A solid gas-generating propellant composition is prepared comprising 28.6 wt. % RDX as the fuel-rich component, 60.0 wt. % ammonium nitrate as the oxidizer component, 1.7 wt. % hydroxypropylcellulose as a binder, and 9.7 wt. % ammonium binoxalate as a coolant.

The solid gas-generating propellant composition is ignited to cause the solid gas-generating propellant composition to burn at a temperature of approximately 2519° K, developing a gas pressure of about 272 atmospheres absolute. At 2519° K and 272 atmospheres absolute pressure, a representative composition of generated propellant gases is as shown in Table 1. Table 2 shows a representative composition of propellant gases after expansion to a pressure of 1 atmosphere absolute. The composition shown in Table 1 is indicative of the composition of propellant gases exiting an inflator, while the composition shown in Table 2 is indicative of the composition of propellant gases in an inflated bag.

TABLE 1

| Gas Component | Mole Percent |
|---|---|
| $H_2O$ | 54.6 |
| $N_2$ | 29.0 |
| $CO_2$ | 14.6 |
| CO | 0.7 |
| $H_2$ | 0.4 |

TABLE 2

| Gas Component | Mole Percent |
|---|---|
| $H_2O$ | 55.1 |
| $N_2$ | 29.2 |
| $CO_2$ | 15.3 |
| CO | 0.04 |
| $H_2$ | 0.3 |

Example 3

A solid gas-generating propellant composition is prepared having RDX as the fuel-rich component and ammonium nitrate as the oxidizer. The RDX is provided in extruded pellets of HES-9753, a gun-type propellant comprising about 76 wt. % RDX and 1 wt. % methyl nitroanaline as a stabilizer, with the remainder split about equally between cellulose acetate butyrate binder and glycidyl azide polymer plasticizer. The ammonium nitrate is in separate, lightly bound granules also having ammonium binoxalate, as a coolant, and hydroxypropylcellulose, as a binder. The composition of the solid gas-generating composition is approximately 64.6 wt. % ammonium nitrate, 18.0 wt. % ammonium binoxalate, 16 wt. % HES-9753 and 0.4 wt. % hydroxypropylcellulose. The solid gas-generating propellant composition, therefore, comprises two discrete physical forms: the extruded pellets of HES-9753 and the lightly bound granules having ammonium nitrate crystals along with ammonium binoxalate and hydroxypropylcellulose.

The solid gas-generating propellant composition is ignited to cause the solid gas-generating composition to burn at a temperature of approximately 2066° K, developing a gas pressure of about 272 atmospheres absolute. Table 3 shows a representative composition for propellant gases at 2066° K and 272 atmospheres absolute, which is indicative of the composition of propellant gases exiting an inflator. Table 4 shows a representative composition for propellant gases after expansion to a pressure of 1 atmosphere absolute, which is indicative of the gas composition within an inflated bag.

TABLE 1

| Gas Component | Mole Percent |
|---|---|
| $H_2O$ | 57.6 |
| $N_2$ | 26.2 |
| $CO_2$ | 13.7 |
| CO | 1.3 |
| $H_2$ | 1.2 |

TABLE 2

| Gas Component | Mole Percent |
|---|---|
| $H_2O$ | 56.3 |
| $N_2$ | 26.2 |
| $CO_2$ | 15.0 |
| CO | 0.07 |
| $H_2$ | 2.4 |

The foregoing description of the invention has been presented for purposes of illustration and description, and is not intended to limit the invention. Variations and modifications commensurate with the above description, together with the skill or knowledge of the relevant art, are within the scope of the present invention. The embodiments described herein are further intended to explain the best mode known for practicing the invention and to enable those skilled the art to utilize the invention in such best mode or other embodiments, with the various modifications that may be required by the particular application or use of the invention. It is intended that the appended claims be construed to include alternative embodiments to the extent permitted by the prior art.

What is claimed is:

1. An inflator for providing, when actuated, propellant gases to inflate a bag of an inflatable safety system, the inflator comprising:

a housing having disposed therein a solid gas-generating propellant composition capable of generating propellant gases in a chemical reaction when the inflator is actuated;

said solid gas-generating propellant composition comprising a solid fuel-rich component that exothermally decomposes when said chemical reaction occurs, said fuel-rich component being in the form of a plurality of spaced, extruded grains;

said solid gas-generating propellant composition also comprising a solid oxygen-containing oxidizer that provides oxygen, when said chemical reaction occurs, to oxidize at least one decomposition product of said fuel-rich component, said oxidizer being disposed in a space between adjacent said propellant grains;

wherein said solid gas-generating propellant composition is substantially free of metal-containing constituents; and wherein said inflator, when actuated to cause said chemical reaction, provides gases that are substantially entirely said propellant gases generated from said solid gas-generating propellant composition.

2. An inflator as recited in claim 1, wherein:
said decomposition product of said fuel-rich component is carbon monoxide; and
oxygen provided by said oxidizer oxidizes to carbon dioxide at least a portion of said carbon monoxide.

3. An inflator as recited in claim 1, wherein:
said oxidizer comprises a nitrate salt.

4. An inflator as recited in claim 1, wherein:
said oxidizer comprises ammonium nitrate.

5. An inflator as recited in claim 1, wherein:
said oxidizer comprises ammonium dinitramide.

6. An inflator, as recited in claim 1, wherein:
said oxidizer is in the form of a plurality of particles; and
said particles of oxidizer are bound in a structure having a porosity sufficient to accommodate expansion of said oxidizer.

7. An inflator as recited in claim 6, wherein:
said structure comprises said particles of oxidizer and a porous web of a polymeric binder to bind said particles of oxidizer in said structure.

8. An inflator, as recited in claim 7, wherein:
said particles are substantially free of said fuel-rich component;
said fuel-rich component being in the form of said extruded grains that are also found in said porous web.

9. An inflator as recited in claim 1, wherein:
said gas-generating propellant composition comprises particles having said oxidizer; and
said particles are bound in a structure having a porosity of larger than about 20 percent.

10. An inflator as recited in claim 9, wherein:
said porosity is larger than about 40 percent.

11. An inflator as recited in claim 1, wherein:
said solid gas-generating composition comprises granules, having said oxidizer, in admixture with said plurality of grains of said fuel-rich component.

12. An inflator as recited in claim 1, wherein:
said inflator is substantially in the absence of a stored gas.

13. An inflator as recited in claim 1, wherein:
said fuel-rich component is a faster burning material than said oxidizer; and
burning of said fuel-rich component, in said chemical reaction, accelerates the burning of said oxidizer.

14. An inflator as recited in claim 1, wherein:
said solid gas-generating propellant composition consists essentially of only elements selected from the group consisting of carbon, oxygen, nitrogen and hydrogen.

15. An inflator as recited in claim 1, wherein:
said fuel-rich component comprises a nitramine compound.

16. An inflator as recited in claim 1, wherein:
said fuel-rich component comprises at least one of RDX and HMX.

17. An inflator as recited in claim 1, wherein:
said fuel-rich component comprises at least one of PETN, TAGN and 5-aminotetrazole.

18. An inflator as recited in claim 1, wherein:
said solid gas-generating propellant composition is substantially free of halogen-containing materials.

19. An inflator as recited in claim 1, wherein:
said propellant gases generated from said solid gas-generating propellant composition, when the inflator is actuated, are such that when expanded to a pressure of one atmosphere absolute, the expanded gases comprise less than about one mole percent carbon monoxide and less than four mole percent hydrogen, and said propellant gases are substantially in the absence of metal-containing materials and halogen-containing materials.

20. An inflator as recited in claim 1, wherein:
said inflator is substantially in the absence of a filter for filtering solid particulates and condensables from said propellant gases.

21. An inflator as recited in claim 1, wherein:
said inflator comprises gas directing means for directing the flow of propellant gases to inflate said bag.

22. An inflator as recited in claim 24, wherein:
said gas directing means comprises a port, in fluid communication with said bag, through a wall of said housing.

23. An inflator for providing, when actuated, propellant gases to inflate a bag of an inflatable safety system, the inflator comprising;

a housing having disposed therein a solid gas-generating propellant composition capable of generating propellant gases in a chemical reaction when the inflator is actuated;

wherein said solid-generating propellant comprises a solid fuel-rich component and a plurality of ammonium nitrate granules, each said granule of ammonium nitrate being coated with a polymeric material; and wherein said solid gas-generating propellant composition is substantially free of metal-containing constituents.

24. The inflator as recited in claim 23, wherein:
said fuel-rich component burns faster than said ammonium nitrate upon ignition and accelerates burning of said ammonium nitrate during said chemical reaction.

25. The inflator as recited in claim 23, wherein:
said solid gas-generating propellant composition comprises at least one of RDX, HMX, PETN, TAGN and 5-aminotetrazole.

26. The inflator as recited in claim 23, wherein:
said solid gas-generating propellant composition is substantially free of halogen-containing materials, such that said propellant gases are substantially in the absence of halogen-containing components.

27. An inflator for providing, when actuated, propellant gases to inflate a bag of an inflatable safety system, the inflator comprising:
a housing having disposed therein a solid gas-generating propellant composition capable of generating propellant gases in a chemical reaction when the inflator is actuated;
said solid gas-generating propellant composition comprising a first solid combustible component that, when combusted alone, generates gases comprising a first mole fraction of carbon monoxide gas, said first solid combustible component being in the form of a plurality of grains;
said solid gas-generating propellant composition also comprising a second solid combustible component that, when combusted in combination with said first component, generates, together with first component, gases having a second mole fraction of carbon monoxide gas that is smaller than said first concentration;
wherein said solid gas-generating propellant composition is substantially free of metal-containing materials, such that said propellant gases generated from said solid gas-generating propellant composition are substantially in the absence of metal-containing particulate materials and metal-containing condensable materials, and wherein said propellant composition is made by the process of mixing a plurality of particles of said second solid combustible component in a polymeric material, forming a web structure from said polymeric material which contains each of said particles of said second solid combustible component, disrupting said web structure with said particles of said second solid combustible component to define a plurality of coated said solid combustible component which are coated with said polymeric material, distributing said plurality of coated said second solid combustible components throughout said plurality of grains of said first solid combustible component and fixing a position of said plurality of coated second solid combustible components relative to said plurality of grains of said first solid combustible component; and
wherein said inflator, when actuated to ignite said first component and said second component, provides gases that are substantially entirely said propellant gases generated from said solid gas-generating propellant composition.

28. The inflator as recited in claim 27, wherein:
said propellant gases, generated when the inflator is actuated, comprise less than about one mole percent carbon monoxide, and are substantially free of halogen-containing components.

29. The inflator as recited in claim 27, wherein:
said second component provides oxygen, during said chemical reaction, to oxidize to carbon dioxide at least some carbon monoxide generated during combustion of said first component.

30. An inflator for providing, when actuated, propellant gases to inflate a bag of an automotive safety system for restraining an occupant of a vehicle, the inflator comprising:
a housing having disposed therein a solid gas-generating propellant composition capable of generating propellant gases when the inflator is actuated;
said solid gas-generating propellant composition comprising particles having a component that undergoes a crystalline phase change within an ambient temperature range of storage and operation of the inflator, said crystalline phase change being accompanied by a volume change;
wherein, said particles are bound in a structure having a porosity of larger than about 20 percent, providing space to accommodate said volume change and reducing the possibility of structural deterioration of said bulk form due to said volume change.

31. The inflator of claim 30, wherein:
said bulk form comprises said particles in a web-bound structure having a porous web of a polymeric material.

32. The inflator of claim 31, wherein:
said polymeric binder comprises a cellulosic material.

33. The inflator of claim 31, wherein:
said polymeric binder comprises hydroxypropylcellulose.

34. The inflator of claim 30, wherein:
said component is an oxidizer component and said particles are first particles; and
said solid gas-generating propellant composition further comprises second particles, different from said first particles, having a fuel-rich component.

35. The inflator of claim 34, wherein:
said second particles have an average size, on a volume basis, greater than about 1000 times as great as the average mass of said first particles.

36. The inflator of claim 34, wherein:
said first particles are smaller than about 100 micrometers and said second particles have a minimum outside dimension of larger than about 1 mm.

37. The inflator of claim 34, wherein:
said second particles comprise extruded pellets.

38. The inflator of claim 34, wherein:
said first particles comprise crystals of said oxidizer component.

39. The inflator of claim 34, wherein:
said fuel-rich component comprises a nitramine compound.

40. The inflator of claim 34, wherein:
said fuel-rich component comprises at least one of RDX and HMX.

41. The inflator of claim 34, wherein:
said structure comprises both of said first particles and said second particles bound in a porous web of a polymeric material.

42. The inflator of claim 30, wherein:
said bulk form has a porosity of greater than about 40 percent.

43. The inflator of claim 30, wherein:
said bulk form has a porosity of greater than about 60 percent.

44. The inflator of claim 30, wherein:
said component comprises an ammonium salt.

45. The inflator of claim 30, wherein:
said component comprises ammonium nitrate.

46. The inflator of claim 30, wherein:
said solid gas-generating propellant composition consists essentially of components composed of only elements selected from the group consisting of carbon, oxygen, nitrogen and hydrogen.

47. The inflator of claim 30, wherein:
said solid gas-generating propellant composition is substantially free of metal-containing components.

48. The inflator of claim 30, wherein:
said temperature range is from about $-40°$ C. to about $105°$ C.

* * * * *